No. 619,566. Patented Feb. 14, 1899.
T. I. HALL.
ANIMAL TRAP.
(Application filed May 21, 1898.)
(No Model.)
Fig. I.
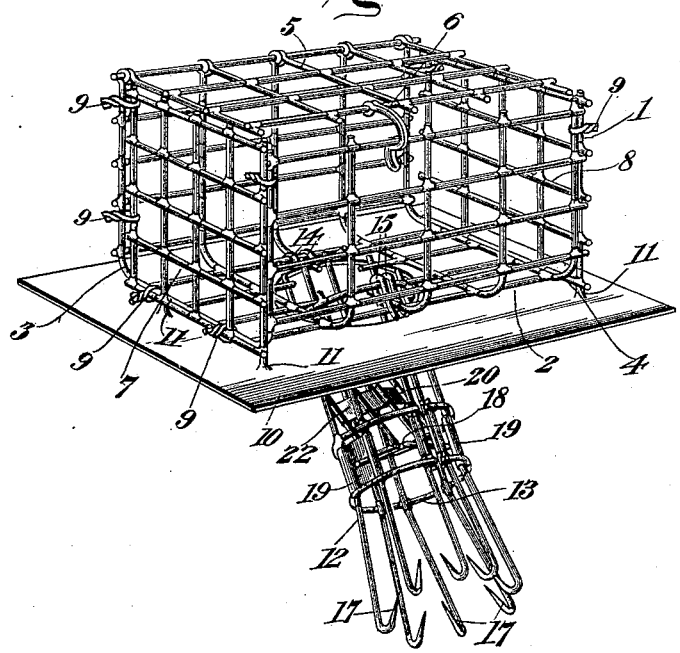
Fig. II.
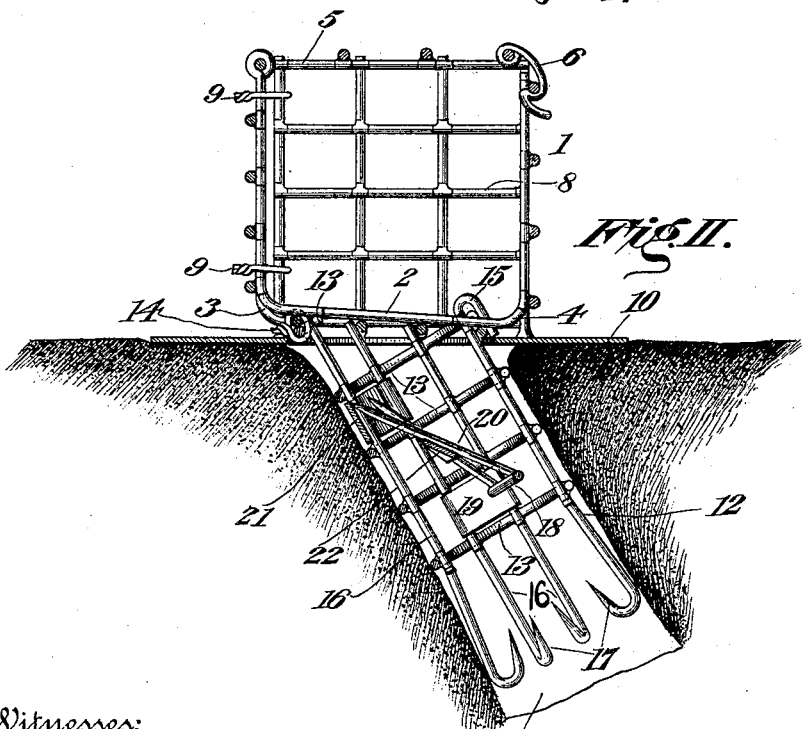
Witnesses:
Inventor:
Thomas I. Hall,
By Joseph L. Atkins,
Attorney
THE NORRIS PETERS CO., PHOTO-LITHO., WASHINGTON, D. C.

UNITED STATES PATENT OFFICE.

THOMAS I. HALL, OF COLEMAN, TEXAS.

ANIMAL-TRAP.

SPECIFICATION forming part of Letters Patent No. 619,566, dated February 14, 1899.

Application filed May 21, 1898. Serial No. 681,400. (No model.)

*To all whom it may concern:*

Be it known that I, THOMAS I. HALL, of Coleman, in the county of Coleman, State of Texas, have invented certain new and useful Improvements in Animal-Traps, of which the following is a specification, reference being had to the accompanying drawings.

The object of my invention is to produce improvements in animal-traps, and more particularly in traps that are designed for catching animals which live or burrow in the earth—such, for example, as prairie-dogs—whereby the animal will be caught as it leaves its den or hole.
My trap includes means for preventing the animal from boring around the hole in that a portion of it extends a considerable distance into the earth and is provided with means for preventing retrogression of the animal after it has once begun to enter the trap.

In the accompanying drawings, Figure I is a perspective view of my trap complete. Fig. II is a central transverse section of the same, the trap being illustrated as in the position which it occupies in use.

Referring to the figures on the drawings, 1 indicates the main frame or body part of my trap. It consists, preferably, of a cage of stout wires crossed and secured together at their intersections or interwoven to form a grating or netting of required mesh. The cage is preferably formed by combining a middle part 2, bent, as indicated at 3 and 4, to form three sides and provided with a hinged door 5, that constitutes the top of the cage, a catch 6 being employed for detachably securing the top when the cage is in use.

7 and 8 indicate end pieces that are secured to the middle part 2, as by twisted wires 9 or other suitable means.

The cage is preferably mounted upon a metallic plate 10, which in use rests upon the ground and affords means for preventing an animal from burrowing around the cage, particularly from the outside. The plate 10 may be, for instance, secured to the cage, as by solder-joints 11, between certain strands of the end pieces 7 and 8 and the plate.

Communicating with the interior of the cage is a hollow shaft or chute 12. It may be made of a piece of material similar to that from which the body part of the cage is made, the same being formed into a preferably cylindrical shape by imparting a suitable curvature to the transverse wires 13.

A portion of the bottom of the body part 1 and of the plate 10 is cut away for the accommodation of the chute 12, which may be secured in place, as by a wire 14, twisted around the upper transverse wire 13 on one side and one of the wires of the body part, and by hooks 15, formed in the upper end of the longitudinal wires 16 of the chute and engaging another wire of the body part. Other means, however, for uniting the chute and body part may be employed, if preferred. The wires 16 at their lower ends terminate substantially in the same plane, which is located at such a distance from the body part as will permit the introduction of the chute 12 a required depth into the ground.

I do not limit myself to any particular length of chute, but have found in practice that the length of the chute may vary from twelve to eighteen inches.

The sharp-pointed extremities 17 of the preferably resilient ends of the wires 16 are respectively bent inwardly and upwardly. By means of this construction after an animal has pushed his head beyond the pointed ends 17 he cannot thereafter withdraw it, but is held there or forced to push his way toward the body part 1 of the trap.

The chute 12 is joined to the body part 1 at an angle, say, of about forty-five degrees, and is provided within its interior with a rock-shaft 18, hinged in suitable bearings in metal plates 19, bent about or otherwise secured to opposite pairs of wires 16. The shaft 18 carries a plurality of fingers 20, whose free ends are sharply pointed and are preferably sustained, as by a strap 21, located underneath their respective points and secured to the wires 16. The fingers may be held in parallel alinement, as by a transverse plate 22, to which they are severally secured. The shaft 18, with the fingers 20 assembled thereon, being operated by gravity, constitutes what may be called a "gravity-gate." The pointed fingers 20 constitute a second series of inwardly-extending sharpened projections within the chute, of which the pointed extremities 17 of the wires 16 are the first series. The several series of inwardly-extending pointed projections constitute means for goading an animal, after it has once begun to enter the trap, onward into the body part of the cage 1.

In practice the trap is set as indicated in Fig. II, the chute 12 being inserted into the hole in the earth 23, which forms the means of ingress and egress to and from the den of the animal sought to be entrapped. The trap is set at a time, that is readily ascertainable, when the animal is known to be in his den. In seeking egress through the hole 23 the animal pushes his way beyond the pointed extremities 17, and being unable to retreat is held there or caused to advance against the fingers 20, which, turning upon the shaft 18, permits him to pass under them; but after he has passed they fall by force of gravity, their pointed ends resting against the strap 21. By this means the entrapped animal is confined in the interior of the body part 1, which is desirable, because if a plurality of animals should successively endeavor to find egress through the hole 23 they may be caught in the body part 1 without resetting the trap.

What I claim is—

1. In an animal-trap, the combination with a body part and a chute projecting therefrom, of inwardly and upwardly projecting points upon the extremity of the chute remote from the body part, adapted to prevent the retreat of an animal after it has begun to enter the chute, substantially as set forth.

2. In an animal-trap, the combination of a body part, and chute projecting therefrom, said chute being provided with a series of longitudinally-disposed wires provided, respectively, with sharp, inwardly and upwardly bent resilient ends, substantially as set forth.

3. In an animal-trap, the combination with a body part mounted upon a plate adapted to rest upon the ground, of a chute communicating with the interior of the body part through the plate, and means for preventing escape of an animal from the body part through the chute, substantially as set forth.

4. In an animal-trap, the combination with a body part, and chute projecting therefrom, of successive series of inwardly-extending sharpened projections within the chute, the first of the series being located near its lower end, whereby an animal after entering the chute is prevented from retreating, and is goaded through the chute into the body part, substantially as set forth.

5. In an animal-trap, the combination with a body part and chute projecting therefrom at an oblique angle, of a gravity-gate provided upon its free end with sharpened projections, and a strap upon the chute against which the sharpened projections normally rest, and by which the gate is supported in the operative position, substantially as set forth.

In testimony of all which I have hereunto subscribed my name.

THOMAS I. HALL.

Attest:
J. M. WOOD,
R. V. WOOD.